(12) United States Patent
Tonomori et al.

(10) Patent No.: US 9,962,912 B2
(45) Date of Patent: May 8, 2018

(54) COMPOSITE SLIDING MEMBER AND HEAT-RESISTANT COMPOSITE SLIDING MEMBER FOR OA EQUIPMENT

(71) Applicant: Toray Industries, Inc., Tokyo (JP)

(72) Inventors: Keiichi Tonomori, Otsu (JP); Hiroshi Tsuchikura, Otsu (JP); Akihiro Tokuda, Otsu (JP)

(73) Assignee: Toray Industries, Inc. (JP)

( * ) Notice: Subject to any disclaimer, the term of this patent is extended or adjusted under 35 U.S.C. 154(b) by 0 days. days.

(21) Appl. No.: 15/123,835

(22) PCT Filed: Feb. 20, 2015

(86) PCT No.: PCT/JP2015/054838
§ 371 (c)(1),
(2) Date: Sep. 6, 2016

(87) PCT Pub. No.: WO2015/133298
PCT Pub. Date: Sep. 11, 2015

(65) Prior Publication Data
US 2017/0008262 A1   Jan. 12, 2017

(30) Foreign Application Priority Data
Mar. 7, 2014  (JP) ................................ 2014-044720

(51) Int. Cl.
*C10M 107/38*  (2006.01)
*C10M 107/46*  (2006.01)
(Continued)

(52) U.S. Cl.
CPC .............. *B32B 27/12* (2013.01); *B32B 5/024* (2013.01); *B32B 5/26* (2013.01); *B32B 27/286* (2013.01);
(Continued)

(58) Field of Classification Search
CPC .......................... C10M 107/38; C10M 107/46
(Continued)

(56) References Cited

U.S. PATENT DOCUMENTS

| | | | | |
|---|---|---|---|---|
| 5,726,232 A | * | 3/1998 | Egami ...................... | C08K 3/32 524/414 |
| 6,476,116 B1 | * | 11/2002 | Egami ...................... | C08K 3/04 524/495 |

(Continued)

FOREIGN PATENT DOCUMENTS

| JP | 59-95126 A | 6/1984 |
|---|---|---|
| JP | 61-114123 U | 7/1986 |

(Continued)

OTHER PUBLICATIONS

Supplementary European Search Report dated Jun. 26, 2017, of corresponding European Application No. 15758787.4.

*Primary Examiner* — Ellen M McAvoy
(74) *Attorney, Agent, or Firm* — DLA Piper LLP (US)

(57) ABSTRACT

A composite sliding member includes a combination of a fiber woven fabric and a resin member, wherein the fiber woven fabric is a multilayer woven fabric having a front surface layer serving as a sliding surface and a rear surface layer adhered to the resin member, the front surface layer mainly including a fluororesin fiber and the rear surface layer mainly including a heat resistant fiber; wherein when a cross section of the composite sliding member crossing the fiber woven fabric, the resin member, and their composite interface is observed, one heat resistant fiber A of such heat resistant fiber at a position adjacent to the resin member with no intervening other fiber in the cross section is observed, and a ratio of a number of monofilaments in the heat resistant fiber A not in close contact with the resin constituting the resin member or adjacent monofilaments in relation to a number of all monofilaments constituting the heat resistant fiber A is R1, and R1 is 0 to 70%.

10 Claims, 1 Drawing Sheet

(51) Int. Cl.
*B32B 27/12* (2006.01)
*B32B 5/26* (2006.01)
*B32B 27/28* (2006.01)
*B32B 27/36* (2006.01)
*B32B 5/02* (2006.01)

(52) U.S. Cl.
CPC .......... *B32B 27/36* (2013.01); *C10M 107/38* (2013.01); *C10M 107/46* (2013.01); *B32B 2307/306* (2013.01); *B32B 2307/704* (2013.01); *B32B 2307/746* (2013.01); *B32B 2457/00* (2013.01); *C10M 2221/0405* (2013.01); *C10N 2220/06* (2013.01); *C10N 2230/08* (2013.01); *C10N 2250/08* (2013.01)

(58) Field of Classification Search
USPC .......................................................... 508/106
See application file for complete search history.

(56) References Cited

U.S. PATENT DOCUMENTS

| | | | | |
|---|---|---|---|---|
| 7,142,803 | B2* | 11/2006 | Koyama | G03G 15/206 219/216 |
| 8,690,438 | B2* | 4/2014 | Karaki | F16C 33/201 384/213 |
| 8,829,130 | B2* | 9/2014 | Xie | C08L 27/18 525/153 |
| 9,605,144 | B2* | 3/2017 | Xie | C08L 61/16 |
| 2005/0147436 | A1 | 7/2005 | Koyama et al. | |
| 2014/0329968 | A1* | 11/2014 | Masuda | C08L 71/00 525/153 |
| 2015/0203679 | A1* | 7/2015 | Ueda | C08L 27/18 428/422 |
| 2015/0369288 | A1* | 12/2015 | Cieslik | C08K 7/24 508/106 |
| 2016/0062280 | A1* | 3/2016 | Kinuta | G03G 15/206 399/333 |
| 2016/0163413 | A1* | 6/2016 | Ueda | C08L 27/18 428/394 |
| 2016/0230004 | A1* | 8/2016 | Nakamoto | C08L 51/003 |

FOREIGN PATENT DOCUMENTS

| | | |
|---|---|---|
| JP | 64-27547 U | 2/1989 |
| JP | 2003-191389 A | 7/2003 |
| JP | 2005-220486 A | 8/2005 |
| JP | 2008-150724 A | 7/2008 |
| JP | 2010-164999 A | 7/2010 |
| JP | 2011-42413 A | 3/2011 |
| JP | 2011-107729 A | 6/2011 |

* cited by examiner

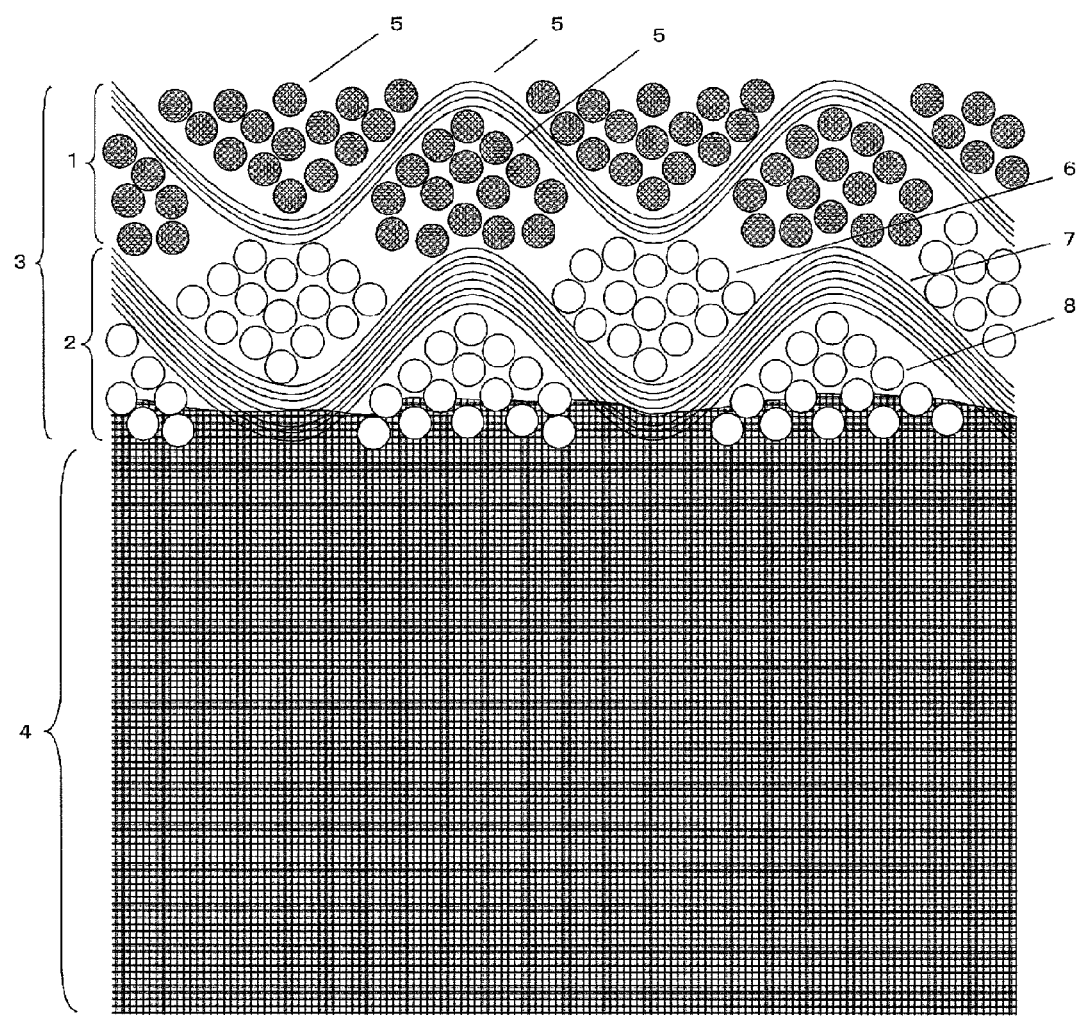

COMPOSITE SLIDING MEMBER AND HEAT-RESISTANT COMPOSITE SLIDING MEMBER FOR OA EQUIPMENT

TECHNICAL FIELD

This disclosure relates to a composite sliding member having low friction property and a heat resistant composite sliding member prepared by incorporating such composite sliding member in OA equipment.

BACKGROUND

Exemplary conventional sliding materials required to have a low friction include sliding members having a substrate with a surface layer having a fluororesin laminated or coated thereon and sliding members having a substrate and a fabric such as woven fabric, knitted fabric, or non-woven fabric disposed thereon, the fabric being the one prepared by using a fluororesin fiber.

However, the fluororesin laminate and coating are insufficient in the fluororesin film thickness, and they are also non-adherent and, therefore, the laminate and the coating have the drawback that they are likely to be peeled off the substrate.

Meanwhile, also disclosed is a technology wherein a fluororesin fiber fabric is used in combination with the sliding member, which is the substrate. For example, Japanese Unexamined Patent Publication (Kokai) No. 2010-164999 discloses a sliding member used as a pressure-applying low-friction sliding member in a toner fixer incorporated in an image forming apparatus such as a photocopier or printer wherein a porous fluororesin woven fabric is used on the surface of the sliding member. Japanese Unexamined Patent Publication (Kokai) No. 2008-150724 discloses a fabric containing a fluorine based fiber mounted on the surface of the vibration-isolating rubber in an automobile stabilizer bar to thereby reduce the friction of the vibration-isolating rubber.

Another known production technology is integration of a woven fabric or a fiber material with a resin member although that technology is not for the sliding member. For example, Japanese Unexamined Patent Publication (Kokai) No. 59-095126 discloses a production of a laminate produced by injecting a thermoplastic resin on the rear surface of a knitted or woven fiber fabric or the like to form the substrate.

As described above in Japanese Unexamined Patent Publication (Kokai) No. 2010-164999 and Japanese Unexamined Patent Publication (Kokai) No. 2008-150724, low friction sliding members wherein the surface of the substrate sliding member is covered with a fluororesin fabric have been disclosed. However, those members are insufficient in the adhesion and securing to the substrate due to the non-sticky nature of the fluorine fiber.

In Japanese Unexamined Patent Publication (Kokai) No. 2010-164999, two or more engagement holes are formed in the fluorine fiber woven fabric, and the substrate is provided with engagement means at positions corresponding to the engagement holes to thereby engage the fluorine fiber woven fabric to the surface of the sliding member. In Japanese Unexamined Patent Publication (Kokai) No. 2008-150724, adhesion to the vibration-isolating rubber is improved by incorporating thermally fusible fibers in the surface of the fabric containing the fluorine-based fibers on the surface opposite to the surface containing the fluorine-based fibers.

As described above, various procedures have been proposed to improve adhesion in securing the inherently non-sticky fluorine fiber fabric to the surface of the substrate sliding member. However, these proposals have been insufficient in improving the adhesion to maintain durability and abrasion resistance under the strong force applied during the sliding. There is also the problem of time, effort, and cost.

Meanwhile, Japanese Unexamined Patent Publication (Kokai) No. 59-095126 uses a thermoplastic resin for both of the fiber woven or knitted fabric (the surface) and the molding material (the substrate), and the substrate material is injected to the rear surface of the surface layer to form the substrate while the front surface layer is softened by heating to realize the integration by thermal fusion. In this process, firm adhesion is enabled by using the same material for both the front surface layer and the substrate. However, this does not provide a low friction material such as fluororesin fiber on the front surface layer in addition to the thermoplastic resin, and does not achieve the low friction and the long life as a sliding member.

In view of the situation as described above, it could be helpful to provide a low friction composite sliding member exhibiting excellent adhesion property by integrating a resin sliding member (the substrate) and a low friction fiber woven fabric.

SUMMARY

We thus provide:

(1) A composite sliding member comprising a combination of a fiber woven fabric and a resin member, wherein the fiber woven fabric is a multilayer woven fabric having front surface layer serving as a sliding surface and rear surface layer adhered to the resin member, the front surface layer mainly comprising a fluororesin fiber and the rear surface layer mainly comprising a heat resistant fiber; wherein when a cross section of the composite sliding member crossing the fiber woven fabric, the resin member, and their composite interface is observed, one heat resistant fiber A of such heat resistant fiber at a position adjacent to the resin member with no intervening other fiber in this cross section is observed, and ratio of number of monofilaments in the heat resistant fiber A not in close contact with the resin constituting the resin member or adjacent monofilaments in relation to number of all monofilaments constituting the heat resistant fiber A is designated R1, R1 is in the range of 0 to 70%.

(2) A composite sliding member according to (1) wherein, when a cross section of the composite sliding member crossing the fiber woven fabric, the resin member, and their composite interface is observed, one heat resistant fiber B of such heat resistant fiber at a position intervened from being adjacent to the resin member by a perpendicular fiber in this cross section is observed, and ratio of number of monofilaments in the heat resistant fiber B not in close contact with the resin continuing from the resin member or adjacent monofilaments in relation to number of all monofilaments constituting the heat resistant fiber B is designated R2, R2 is in the range of 10 to 100%, and R2 is greater than R1.

(3) A composite sliding member according to (1) or (2) wherein the resin member comprises a thermoplastic resin having heat resistance.

(4) A composite sliding member according to any one of (1) to (3) wherein the resin used in the heat resistant fiber and the resin used in the resin member both comprise a thermoplastic resin of the same material.

(5) A composite sliding member according to (3) or (4) wherein the thermoplastic resin is a polyphenylene sulfide resin or a liquid crystal polyester resin.

(6) A heat resistant composite sliding member for OA equipment wherein the composite sliding member of any one of (1) to (5) is used for the application of OA equipment.

We provide a heat resistant low friction composite sliding member having long-term low friction, durability, and abrasion resistance by improving adhesion through integration of the resin member (the substrate) and the multilayer woven fabric of a fluororesin fiber in an adequate form.

BRIEF DESCRIPTION OF THE DRAWING

FIG. 1 is a cross-sectional schematic view of an exemplary composite sliding member.

EXPLANATION OF NUMERALS

1: front surface layer
2: rear surface layer
3: fiber woven fabric
4: resin member
5: fluororesin fiber
6: heat resistant fiber
7: heat resistant fiber
8: heat resistant fiber

DETAILED DESCRIPTION

Next, examples of our sliding materials are described by referring to FIG. 1. FIG. 1 is a cross-sectional schematic view of an exemplary composite sliding member.

FIG. 1 is a schematic view of an example of double woven fabric prepared by using a multifilament for both of the fluororesin fiber and the heat resistant fiber. The schematic view is the same when the fibers were spun yarn.

The composite sliding member is a composite sliding member having a fiber woven fabric 3 integrated with the sliding surface of the resin member 4 which is the substrate.

The fiber woven fabric 3 is a multilayer woven fabric comprising a front surface layer 1 serving as the sliding surface and a rear surface layer 2 serving as a surface to be adhered to the resin member. The multilayer woven fabric is a woven fabric produced by using two or more types of fibers to realize a structure with variable ratio of the fiber constituting the front surface layer to the fiber constituting the rear surface layer. Examples include multiple woven fabric such as double woven fabric comprising the front surface layer and the rear surface layer and, also, satin, twill, double-weft fabric, and double-warp fabric.

In the multilayer woven fabric constituting the composite sliding member, the front surface layer 1 mainly comprises a fluororesin fiber 5 to improve the sliding property, and the rear surface layer 2 of the woven fabric mainly comprises a heat resistant fiber to improve adhesion. The fact that the rear surface layer 2 mainly comprises the heat resistant fiber means that a relatively small number of the fluororesin fibers are present and exposed in the rear surface layer. The reduced exposure of the non-sticky fluororesin fibers enables improvement in adhesion between the rear surface layer 2 and the resin member 4. Of the fibers observable from the rear surface of the multilayer woven fabric, the area proportion of the fluororesin fibers is preferably up to 50%, more preferably up to 25%.

In FIG. 1, the heat resistant fiber 8 is located at a position adjacent to the resin member 4, and the heat resistant fiber 7 intersects at right angle with the heat resistant fiber 8. And the heat resistant fiber 6 is not adjacent to the resin member 4 since another heat resistant fiber 7 is present therebetween. The heat resistant fibers 6, 7, and 8 may be either in the form of a multifilament or a spun yarn, and these are respectively composed of several monofilaments. The "monofilament" as used herein is the minimum unit of the fiber forms, and the monofilament includes both the monofilament in the form of a long fiber each constituting the multifilament and the monofilament in the form of a short fiber each constituting the spun yarn. In FIG. 1, each monofilament constituting the multifilament is shown as a circular cross section.

The fluororesin fiber is preferably a polytetrafluoroethylene fiber. Exemplary materials constituting the polytetrafluoroethylene fiber include a homopolymer of tetrafluoroethylene and a copolymer wherein tetrafluoroethylene constitutes at least 90 mol % and preferably at least 95 mol % of the entire material, and in view of the sliding property, higher content of the tetrafluoroethylene unit is preferable, and the fluororesin fiber is preferably a homopolymer.

Non-limiting examples of the monomer that can be copolymerized with the tetrafluoroethylene include fluorovinyl compounds such as trifluoroethylene, trifluorochloroethylene, tetrafluoropropylene, and hexafluoropropylene and vinyl compounds such as propylene, ethylene, isobutylene, styrene, and acrylonitrile. Of these monomers, the preferred are fluorovinyl compounds, and the more preferred are those having high fluorine content in view of fiber friction properties.

The "heat resistant fiber" as used herein means a fiber less likely to undergo melting, softening, degradation, burning when exposed to the frictional heat generated during its use as the sliding member, the heat conducted when the sliding member slides on a high-temperature substance, or the heat generated when the apparatus including the sliding member is intentionally heated. Exemplary such heat resistant fibers include fibers constituted from a resin or an inorganic material having a melting point or a thermal degradation temperature of approximately 270° C. or higher. Examples include polyparaphenylene terephthalamide, polymethaphenylene isophthalamide, glass, carbon, polyparaphenylene benzobisoxazole (PBO), polyphenylene sulfide (PPS), liquid crystal polymer (LCP) such as liquid crystal polyester.

In the composite sliding member, the fiber woven fabric 3 and the resin member 4 are firmly adhered to each other, and the degree of adhesion is affected by the state of the rear surface layer 2 as observed in any cross section (vertical cross section) of the composite sliding member crossing the fiber woven fabric 3, the resin member 4, and their composite interface. In other words, effective adhesion will be achieved when the resin constituting the resin member 4 is in close contact with the entire periphery, or at least a part, of the monofilaments of the rear surface layer 2. In addition, the monofilaments not in close contact with the resin also contribute to the strength of the rear surface layer when they are thermally fused with adjacent monofilaments and, in turn, such filaments also contribute to the improvement of adhesion strength. When the monofilaments become thermally fused, the contact between the monofilaments changes from point contact to linear contact when observed in cross section, and the interface disappears in the contact area and the so-called "neck growth" takes place to form the neck having a low curvature. The monofilaments are "in close contact" when the monofilaments are thermally fused.

In the vertical cross section as described above, when the ratio of the number of the monofilaments in the heat resistant fiber A not in close contact with either the resin constituting the resin member nor the adjacent monofilaments to the total number of monofilaments constituting one heat resistant fiber A at a position adjacent to the resin member with no intervening other heat resistant fiber is designated R1, this R1 is preferably 0 to 70% to be effective.

Next, measurement of R1 is explained by referring to FIG. 1. First, of the heat resistant fibers, one heat resistant fiber A at a position adjacent to the resin member 4 with no intervening other heat resistant fiber 7 (for example, any one of the heat resistant fiber 8 in FIG. 1) is randomly selected. Of all monofilaments constituting the selected one heat resistant fiber A (multifilament) in the cross section of such heat resistant fiber A, proportion (ratio) of the monofilaments not in close contact with the resin of the resin member 4 or the adjacent monofilaments is designated R1. R1 is 0 to 70%, and preferably 0 to 50% as described above.

The monofilament not in close contact with the resin of the resin member is the monofilament wherein the resin is not in contact with the entire periphery, or a part thereof, of the monofilament. In other words, the monofilament is determined to be in close contact with the resin when at least a part of the monofilament periphery is observed to be in contact with the resin in the monofilament cross section.

The monofilament not in close contact to the adjacent monofilament is the monofilament not thermally fused to the adjacent monofilament. Not only the monofilaments not in contact with the adjacent monofilament, but also the monofilaments seemingly in contact with another monofilament, but not thermally fused are also not in close contact. The absence of the thermal fusion can be determined by the absence of the neck with slight curvature formed by the neck growth at the position of the contact or by the observation of interface between both monofilaments at the place of contact.

When R1 is greater than 70%, the degree of adhesion between the monofilament and resin or degree of fusion between the monofilaments will be insufficient. Hence, adhesion between the fiber woven fabric and the resin member will be insufficient. R1 of up to 50% is favorable in view of stronger adhesion.

As described above, adhesion is determined by the state of the close contact of the periphery of the monofilaments with the resin or the thermal fusion state between adjacent monofilaments. However, quantitative measurement of the state of the monofilaments after their integration may be difficult, and attempts are made to focus the non-integrated monofilaments, and excellent effects are thereby realized by confirming and controlling the proportion of the non-integrated monofilaments.

The state of the close contact of the monofilament or the fiber which is the assembly of the monofilaments to the resin is influenced by the fiber type and weaving conditions of the fiber woven fabric as well as the resin type. The state of the close contact, however, may also be controlled by the heating temperature, resin temperature, pressure conditions, and the like used in the thermal melting and molding of the resin.

Gaps between the monofilaments constituting each heat resistant fiber contribute for the maintenance of slidability, namely, durability by serving shelter spaces to accommodate broken pieces of the fluororesin fibers in the front surface layer generated by the abrasion of the fluororesin fibers by the sliding force. Accordingly, it is also preferable to control the gaps between the monofilaments of each heat resistant fiber in view of the slidability. More specifically, the value of R2 measured by the procedure as described below is preferably controlled.

First, one heat resistant fiber B at a position not adjacent to the resin member due to the presence of other heat resistant fiber 7 (for example, any one of the heat resistant fibers 6 in FIG. 1) is randomly selected from the heat resistant fibers. When the ratio of the number of monofilaments not in close contact with the resin continuing from the resin member or adjacent monofilaments to the number of all monofilaments constituting this one multifilament is designated R2 in the cross section of the heat resistant fiber B, R2 is preferably 10 to 100% and R2 is preferably greater than R1. When R2 is in such range, adhesion will be realized in the heat resistant fibers in the rear surface layer 2, and gaps will be reliably provided between the monofilaments of the heat resistant fibers at appropriate position and, as a consequence, slidability will be improved with elongated life. More preferably, R2 is 30 to 100% and R2 is greater than R1. The state may be different depending on the number of all monofilaments constituting the heat resistant fiber B and the monofilament diameter, and R2 of less than 10% results in the insufficiency of the gaps contributing for the maintenance of the slidability and durability, and R2 of at least 30% results reliable formation of the efficient gaps.

The resin member 4 is the substrate of the composite sliding member and, accordingly, it should have the mechanical strength required for a structural member and should be moldable into a complicated shape required for incorporation and functioning in the apparatus, and it should be capable of impregnating into the gaps between the monofilaments of the fiber woven fabric to secure the adhesion. Accordingly, the resin member 4 preferably comprises a thermoplastic resin. The thermoplastic resin can be used for compression molding and injection molding after melting the resin with heat, and it is also capable of being impregnated into the gaps between the fibers in the rear surface layer 2 of the fiber woven fabric 3 and gaps between the monofilaments constituting the fibers for close contact with the monofilaments and adhesion. Of these, the most preferred is the injection molding due to high freedom in the shaping as the resin member 4.

Exemplary such thermoplastic resins include vinyl chloride resin, polystyrene, ABS resin, polyethylene, polypropylene, polyamide resin, polycarbonate resin, polyesters such as polyethylene terephthalate (PET) and polybutylene terephthalate (PBT), polyphenylene sulfide (PPS), polyether ether ketone (PEEK), liquid crystal polymers such as liquid crystal polyester, amorphous polyallylate, polyetherimide, synthetic rubbers and elastomers such as thermoplastic polyurethane, butadiene rubber, nitrile rubber, neoprene, and polyester, and mixtures thereof.

The resin member 4 may preferably comprise a heat resistant thermoplastic resin since this member may experience a high temperature by the heat generated in its use as a sliding member or by an intentional heating. The term "heat resistant thermoplastic resin" means a thermoplastic resin having a melting point of approximately 270° C. or higher, and such thermoplastic resin may be selected from PPS, PEEK, liquid crystal polymers (LCP) such as liquid crystal polyester, amorphous polyallylate, polyetherimide and the like. In addition to heat resistance, the resin member 4 should also have moldability so that it can be molded into a molded article, for example, by melt molding such as injection molding. Accordingly, the thermoplastic resin is more preferably PPS or liquid crystal polyester.

PPS resin is a material having extremely high strength and rigidity as well as high abrasion resistance in addition to heat resistance, and it is a material durable even under severe conditions since this resin also has chemical resistance and resistance to hydrolytic degradation.

Liquid crystal polyester resin which is a liquid crystal polymer has good chemical resistance and impact strength in addition to the high heat resistance and, due to its excellent size stability, this material is highly suitable for use in high-precision parts requiring processing into complicated or intricate shapes.

The material used for the heat resistant fiber mainly located in the rear surface layer 2 of the fiber woven fabric 3 is preferably suitable for use with the thermoplastic resin constituting the resin member 4, namely, having high affinity and compatibility for the thermoplastic resin constituting the resin member 4. The degree of affinity and compatibility may be determined by the presence of a terminal group having high chemical affinity or by a structural similarity at the molecular level. For example, those having the same type of bond such as amide bond, ester bond, or sulfide bond may be determined to have a high compatibility.

The material used for the heat resistant fiber is preferably a thermoplastic resin which is the same material as the thermoplastic resin used for the resin member 4. The term "same material" means that it contains the same thermoplastic resin as its main constituent while it may contain different sub-constituents depending on the steps, additives, starting materials and the like when it is formed into a fiber or a woven fabric, or a resin or a molded article.

When both of the heat resistant fiber and the resin used for the resin member comprise a thermoplastic resin and they are the same material, sufficient adhesion will be realized between the heat resistant fiber and the resin of the resin member with sufficient affinity. Also, when the thermoplastic resin of the resin member 4 melts and impregnates in the rear surface layer 2 of the fiber woven fabric, the rear surface layer of the fiber woven fabric may also receive a thermal stress of similar conditions and, in such case, adjacent monofilaments are more likely to be integrated by thermal fusion. This contributes to improvement of the adhesion.

Exemplary suitable heat resistant thermoplastic resins that can be commonly used for the heat resistant fiber and the resin member 4 include PPS resin and liquid crystal polyester resin.

As described above, the low friction composite sliding member comprising the substrate resin sliding member integrated with the low friction fluororesin fiber woven fabric has the low friction properties and the heat resistance of the fiber woven fabric as well as the structural member properties and injection moldability of the substrate resin member. Accordingly, the performance required for the sliding material used in application of OA equipment is fully met, and such sliding member is suitable for use in the OA equipment application wherein mechanical and thermal processes are conducted in a compact apparatus. Of such OA equipment, the sliding member is most suitable for use as the sliding member in the step where pressure and heat are applied to the non-fixed toner image on a recording paper passing therethrough in an image forming apparatus such as photocopier and printer, or a toner fixer incorporated in such apparatus.

EXAMPLES

Next, Examples and Comparative Examples are described.

The properties used in the Examples are measured by the procedures as described below.

(1) Ratio of the Monofilaments not in Close Contact with the Resin or the Adjacent Monofilaments in the Vertical Cross Section of the Composite Sliding Member (R1, R2)

Test specimens were prepared to enable observation of areas around the cross sections of the warp and weft heat resistant fibers in the resin member and the rear surface layer of the woven fabric in the vertical cross sections obtained by cutting the composite sliding member sheet in the vertical direction and longitudinal direction of the woven fabric (cross section of the composite sliding member crossing the fiber woven fabric, the resin member, and their composite interface). Pictures were taken by a scanning electron microscope (SEM).

In the pictures of the areas around the cross sections of the warp and weft heat resistant fibers, one heat resistant fiber (A) is randomly selected at the location where the heat resistant fiber is adjacent to the resin member with no intervening heat resistant fiber, and number of monofilaments observed to be not in contact with the resin continuing from the resin member or the adjacent monofilaments in the heat resistant fiber (A) is counted, and this number is represented as a percentage in relation to the number of all monofilaments. Average is calculated for the percentages obtained in three fields (n=3) for each of the areas around the cross sections of the warp and weft, and this value is used for R1.

In determining the presence of the close contact between the monofilament in the picture of monofilament cross section, the monofilament is determined to be in close contact with the resin when at least a part of the periphery of the monofilament cross section is in contact with the resin. For the close contact between the monofilaments, the monofilament is determined to be not in close contact with the adjacent monofilament when the presence of a neck having a curvature reduced by the neck growth cannot be confirmed or if an interface dividing adjacent monofilaments is observed at the contact part of the adjacent monofilaments even if adjacent monofilaments are in contact with each other.

The scanning electron microscope used was S-3500N manufactured by HITACHI, and the microscope was used under the conditions including a magnification of 200, resolution of 640×480, and a scanning speed of 80/100 s.

In the pictures of the areas around the cross sections of the warp and weft heat resistant fibers, one heat resistant fiber (B) is randomly selected at the location where the heat resistant fiber is not adjacent to the resin member with intervening perpendicular heat resistant fiber, and the number of monofilaments observed to not be in contact with the resin continuing from the resin member or the adjacent monofilaments in the heat resistant fiber (B) is counted, and this number is represented as a percentage in relation to the number of all monofilaments. An average is calculated for the percentages obtained in three fields (n=3) for each of the areas around the cross sections of the warp and weft, and this value is used for R2.

Confirmation of the number of all monofilaments in the heat resistant fiber may be difficult in the location where most of the monofilaments in one fiber are integrated with the resin or with another monofilament. In such case, measurement precision may be improved by observing a fiber which is the same as the heat resistant fiber to be observed and located sufficiently remote from the resin member allowing the observation of clear cross-sectional contour of each monofilament.

(2) Peel Strength between the Resin Member and the Fiber Woven Fabric

The measurement was conducted according to method B defined in JIS L1021-9:2007. The test specimen with the size of 50 mm×150 mm×3 mm was cut out of a flat sheet of the composite sliding member. 80 mm in length of the fiber woven fabric of 150 mm was preliminarily peeled off the resin member, and the peeled end of the fiber woven fabric and the resin member were gripped by the upper and lower chucks of a tensile tester.

Subsequently, the fiber woven fabric and the resin member were pulled apart at a constant speed of 100 mm/min to peel a length of 50 mm. The maximum load (N) in the peeling of 50 mm was recorded.

The peel strength may be different in the longitudinal and vertical directions and, therefore, 3 specimens were prepared for each of the peeling in the longitudinal and vertical directions of the fiber woven fabric, and the average of the 6 specimen measurements was used for the peel strength.

(3) Coefficient of Friction and Wear (Ring Abrasion Test)

The measurement was conducted according to JIS K7218: 1986 (Testing Methods for Sliding Wear Resistance of Plastics), method A. The ring abrasion tester used was model EFM-III-EN manufactured by ORIENTEC CORPORATION, and the test was conducted at a frictional load of 10 MPa and a frictional speed of 10 mm/sec to measure sliding torque to the frictional sliding distance of 100 m.

The counter material was a hollow cylinder made of S45C having an outer diameter of 25.6 mm, an inner diameter of 20 mm, and a length of 15 mm having its surface polished with a sandpaper to the range of 0.8 μm±0.1 Ra when measured by a surface roughness tester (SJ-201 manufactured by Mitsutoyo).

The test specimen was cut out of the composite sliding member sheet to a size of 30 mm×30 mm×3 mm. 3 specimens were prepared.

The coefficient of friction was determined by calculating the coefficient of friction in the stable part of the sliding torque measurement, and wear was determined by measuring weight before and after the test to calculate the weight loss, and calculating the average of the three specimens. The coefficient of friction was evaluated A when the coefficient of friction was 0.10 to 0.15, B when it was 0.16 to 0.20, C when it was 0.21 to 0.25, and D when it was 0.26 or higher or the woven fabric was wore and torn by the abrasion. The wear was evaluated A when the weight loss was up to 4.0 mg, B when it was 4.1 to 5.0 mg, C when it was 5.1 to 6.0 mg, and D when it was at least 6.1 mg. The criteria are shown below Table 1.

Example 1

A plane weave double fabric was prepared by using a rapier weaver. For the fluororesin fiber constituting the front surface layer of the fiber woven fabric, a polytetrafluoroethylene (PTFE) fiber of 440 dtex, 60 filaments, twisting number of 300 t/m was used for both the warp and the weft, and for the thermoplastic resin fiber constituting the rear surface layer of the woven fabric, a polyphenylene sulfide (PPS) fiber of 220 dtex, 50 filaments, and twisting number of 130 t/m was used for both the warp and the weft. The warp weaving density was 70+70 (fluororesin fiber woven fabric (warp)+PPS fiber woven fabric (warp) (warps/2.54 cm)), and weft weaving density was 60+60 (fluororesin fiber woven fabric (weft)+PPS fiber woven fabric (weft) (wefts/2.54 cm)). The fluororesin fiber woven fabric and the PPS fiber woven fabric were twined such that the twining frequency of the warps of the fluororesin fiber woven fabric and PPS fiber woven fabric was 0.2. The thus woven fabric was then scoured in a scouring tank at 80° C., and the fabric was set at 200° C.

Next, test specimens of the composite sliding member sheets were prepared by using an injection molding machine (J110AD-110H manufactured by THE JAPAN STEEL WORKS, LTD.) equipped with an injection molding mold capable of molding a sheet with the size of 100 mm×150 mm×3 mm by the procedure as described below. First, the fiber woven fabric was placed in the core (movable) of the mold like insert molding so that the rear surface of the fiber woven fabric faces toward the inside of the mold, and then, PPS resin was injected into the cavity to prepare a composite sliding member comprising the fiber woven fabric integrated with the resin sheet. The injection molding was conducted under the conditions at a cylinder temperature of 320° C., a mold temperature of 130° C., an injection pressure of 150 MPa, and an injection speed of 20 mm/sec.

The PPS resin used was "TORELINA" (registered trademark) A604 manufactured by Toray.

Example 2

The procedure of Example 1 was repeated except that the injection speed was changed to 5 mm/sec in the injection molding.

Example 3

The procedure of Example 1 was repeated except that the injection speed was changed to 10 mm/sec in the injection molding.

Example 4

The procedure of Example 1 was repeated except that the injection speed was changed to 30 mm/sec in the injection molding.

Comparative Example 1

A woven fabric was prepared under the weaving conditions the same as those of the procedure of Example 1 except that the weft weaving density of the fabric was changed from 60+60 (fluororesin fiber woven fabric (weft)+PPS fiber woven fabric (weft) (wefts/2.54 cm)) to 80+80 (fluororesin fiber woven fabric (weft)+PPS fiber woven fabric (weft) (wefts/2.54 cm)). The injection molding was conducted by repeating the procedure of Example 1 to produce the composite sliding member.

Example 5

The procedure of Example 1 was repeated except that the thermoplastic resin for the resin member supplied to the injection molding was changed to liquid crystal polyester resin, and the injection molding conditions were changed to a cylinder temperature of 330° C. and an injection pressure of 100 MPa.

The liquid crystal polyester resin used was "SIVERAS" (registered trademark) LX70T35H manufactured by Toray.

Comparative Example 2

A woven fabric was prepared under the weaving conditions the same as those of the procedure of Example 1 except that the thermoplastic resin fiber constituting the rear surface layer of the woven fabric was changed to a polyethylene terephthalate (PET) fiber of 220 dtex, 48 filaments, and no twisting for both the warp and the weft. With regard to the resin member, the thermoplastic resin used for the injection molding was changed to polybutylene terephthalate (PBT) resin, and the injection molding was conducted under the same conditions as those used in Example 1 except that the cylinder temperature was changed to 260° C. to produce the composite sliding member.

The polybutylene terephthalate (PBT) resin used was "TORAYCON" (registered trademark) 1101G-30 manufactured by Toray.

Comparative Example 3

The procedure of Comparative Example 2 was repeated except that the injection speed was changed to 5 mm/sec in the injection molding.

For the composite sliding members produced in Examples 1 to 5 and Comparative Examples 1 to 3, the results of the measurement of the ratios R1 and R2 of the monofilaments not in close contact with the resin or the adjacent monofilaments in the rear surface layer of the woven fabric, the peel strength test, and the ring abrasion test are shown in Table 1.

5, while the type of the resin used for the resin member has been changed to liquid crystal polyester resin, the cylinder temperature has been controlled and, accordingly, the ratios R1 and R2 of the monofilaments not in close contact with the resin or the adjacent monofilaments are within our range. On the other hand, in Comparative Example 1, while the type of materials used for the fiber woven fabric and the resin member as well as the conditions used for the injection molding were the same as those of Example 1, weft density in the weaving was increased, and as a consequence, R1 is outside our range. In Comparative Examples 2 and 3, the PET fiber constituting the rear surface layer of the woven fabric is different from our heat resistant fiber, and in Comparative Example 3, R1 is outside our range.

As a consequence, the sliding materials of Examples 1 to 5 exhibited excellent adhesion between the resin member and the fiber woven fabric as well as low coefficient of friction and high durability with reduced abrasion.

On the other hand, the sliding materials of Comparative Examples 1 and 3 exhibited insufficient resin impregnation into the fiber woven fabric, and this resulted in the inferior adhesion and poor sliding property due to the peeling in the abrasion test.

The sliding members prepared in Comparative Examples 2 and 3 are not suitable for the application of heat resistant sliding member since these members were prepared by using a PET fiber which is not a heat resistant fiber.

A picture at a magnification of 15 was taken for the area of 1 cm×1 cm in the rear surface of the fiber woven fabrics used in Examples 1 to 5 by using a microscope (VHX-2000 manufactured by Keyence). Of the fibers observed in the picture, the fluororesin fiber and the PPS fiber were colored in different colors to evaluate area ratio of the fluororesin fibers. The area ratio of the fluororesin fibers was 10% in all cases.

TABLE 1

| | | Ex. 1 | Ex. 2 | Ex. 3 | Ex. 4 | Comp. Ex. 1 | Ex. 5 | Comp. Ex. 2 | Comp. Ex. 3 |
|---|---|---|---|---|---|---|---|---|---|
| Resin type | Front surface layer of the woven fabric | PTFE | PTFE | PTFE | PTFE | PTFE (*) | PTFE | PTFE | PTFE |
| | Rear surface layer of the woven fabric | PPS | PPS | PPS | PPS | PPS (*) | PPS | PET | PET |
| | Resin member | PPS | PPS | PPS | PPS | PPS | Liquid crystal polyester | PBT | PBT |
| Ratio of monofilaments not in close contact (%) | R1 (adjacent area) | 30 | 70 | 50 | 0 | 90 | 50 | 0 | 90 |
| | R2 (non-adjacent area) | 80 | 100 | 100 | 40 | 100 | 100 | 0 | 100 |
| Peel strength (N) | | 60 | 30 | 40 | 60 | 10 | 40 | 60 | 10 |
| Ring abrasion test | Coefficient of friction | A 0.11 | B 0.18 | A 0.13 | A 0.13 | C 0.23 | A 0.12 | B 0.20 | D 0.30 |
| | Wear | A 4.0 | B 4.7 | B 4.5 | C 5.1 | C 5.6 | A 3.9 | C 5.4 | D 6.2 |

(*) Weaving density of the weft was higher than Examples 1 to 4.

Criteria for the coefficient of friction

A: 0.10 to 0.15
B: 0.16 to 0.20
C: 0.21 to 0.25
D: 0.26 or higher, or wore or torn by abrasion Criteria for the wear A: weight reduction of up to 4.0 mg
B: weight reduction of 4.1 to 5.0 mg
C: weight reduction of 5.1 to 6.0 mg
D: weight reduction of at least 6.1 mg As described above, the injection speed in the injection molding was changed in Examples 1 to 4, and this resulted in a change of the resin temperature in the filling of the resin in the mold, and the degree of resin impregnation in the gap between the fibers was altered, and this resulted in the change of the ratios R1 and R2 of the monofilaments not in close contact with the resin or the adjacent monofilaments. The R1 and R2, however, were still in our range. In Example

The invention claimed is:

1. A composite sliding member comprising a combination of a fiber woven fabric and a resin member, wherein the fiber woven fabric is a multilayer woven fabric having a front surface layer serving as a sliding surface and a rear surface layer adhered to the resin member, the front surface layer mainly comprising a fluororesin fiber and the rear surface layer mainly comprising a heat resistant fiber; wherein when a cross section of the composite sliding member crossing the fiber woven fabric, the resin member, and their composite interface is observed, one heat resistant fiber A of such heat resistant fiber at a position adjacent to the resin member with no intervening other fiber in the cross section is observed, and a ratio of a number of monofilaments in the heat resistant fiber A not in close contact with the resin constituting the resin member or adjacent monofilaments in relation to a number of all monofilaments constituting the heat resistant fiber A is R1, and R1 is 0 to 70%.

2. The composite sliding member according to claim 1, wherein, when a cross section of the composite sliding member crossing the fiber woven fabric, the resin member, and their composite interface is observed, one heat resistant fiber B of such heat resistant fiber at a position intervening from being adjacent to the resin member by a perpendicular fiber in the cross section is observed, and a ratio of a number of monofilaments in the heat resistant fiber B not in close contact with the resin continuing from the resin member or adjacent monofilaments in relation to a number of all monofilaments constituting the heat resistant fiber B is R2, R2 is 10 to 100%, and R2 is greater than R1.

3. The composite sliding member according to claim 1, wherein the resin member comprises a thermoplastic resin having heat resistance.

4. The composite sliding member according to claim 2, wherein the resin member comprises a thermoplastic resin having heat resistance.

5. The composite sliding member according to claim 1, wherein the resin in the heat resistant fiber and the resin in the resin member both comprise a thermoplastic resin of the same material.

6. The composite sliding member according to claim 2, wherein the resin in the heat resistant fiber and the resin in the resin member both comprise a thermoplastic resin of the same material.

7. The composite sliding member according to claim 3, wherein the resin in the heat resistant fiber and the resin in the resin member both comprise a thermoplastic resin of the same material.

8. The composite sliding member according to claim 3, wherein the thermoplastic resin is a polyphenylene sulfide resin or a liquid crystal polyester resin.

9. The composite sliding member according to claim 5, wherein the thermoplastic resin is a polyphenylene sulfide resin or a liquid crystal polyester resin.

10. A heat resistant composite sliding member for OA equipment wherein the composite sliding member of claim 1 is used for the application of OA equipment.

* * * * *